US006983128B2

(12) United States Patent
Wright

(10) Patent No.: US 6,983,128 B2
(45) Date of Patent: Jan. 3, 2006

(54) RADIO CONTROL TRANSMITTER AND RECEIVER

(75) Inventor: Elliot Wright, Enfield (GB)

(73) Assignee: Ripmax plc., Enfield (GB)

( * ) Notice: Subject to any disclaimer, the term of this patent is extended or adjusted under 35 U.S.C. 154(b) by 262 days.

(21) Appl. No.: 10/089,510

(22) PCT Filed: Jul. 31, 2001

(86) PCT No.: PCT/GB01/03437

§ 371 (c)(1), (2), (4) Date: Oct. 8, 2002

(87) PCT Pub. No.: WO02/11097

PCT Pub. Date: Feb. 7, 2002

(65) Prior Publication Data

US 2003/0100271 A1 May 29, 2003

(30) Foreign Application Priority Data

Aug. 1, 2000 (GB) .................................... 0018855

(51) Int. Cl.
*H04B 1/38* (2006.01)

(52) U.S. Cl. ............................ 455/73; 455/77; 455/78; 455/183.2; 455/192.1; 455/184.1; 455/185.1

(58) Field of Classification Search .................. 455/73, 455/77, 78, 183.2, 192.1, 184.1, 185.1
See application file for complete search history.

(56) References Cited

U.S. PATENT DOCUMENTS 4,277,785 A * 7/1981 Schotz et al. ................. 345/39
5,121,430 A * 6/1992 Ganzer et al. .............. 380/258
5,649,285 A * 7/1997 Cautley ...................... 725/138
5,805,230 A * 9/1998 Staron ........................ 348/460
5,856,971 A * 1/1999 Gitlin et al. ................ 370/335
5,896,094 A * 4/1999 Narisada et al. ........... 340/5.64

* cited by examiner

*Primary Examiner*—Marceau Milord
(74) *Attorney, Agent, or Firm*—Michael Y. Epstein

(57) ABSTRACT

Radio control is used for different types of models, e.g. aircraft, cars and boats. Commonly, a number of different radio channels are allocated in a frequency band for use in radio control. If a modeller finds her or his intended channel in use, s/he can either wait until it becomes free, or retune the transmitter and receiver to a channel which is not in use. This can involve changing two crystals, one of which, in the receiver, may involve partly disassembling the model. A radio control receiver is disclosed having data storage containing code unique to the receiver. The receiver has a tuner arranged to scan a plurality of radio channels. A processor is arranged to process receiver identifying code received on a channel, with the unique code to determine whether transmissions on the channel are intended for the receiver. The tuner is responsive to an output from the processor indicating that transmissions on the channel are intended for the receiver, to lock onto that channel, and to the output from the tuner indicating that the transmissions on that channel are not intended for the receiver, to tune to another of the plurality of radio channels. Having ascertained that a channel is free, the modeller tunes her or his transmitter, switches that on and switches on the receiver. The latter identifies the channel and locks on to it.

15 Claims, 3 Drawing Sheets

RADIO CONTROL TRANSMITTER AND RECEIVER

This invention relates to radio control transmitters and receivers.

Radio control is used for different types of models, e.g. aircraft, cars and boats. Commonly, a number of different radio channels are allocated in a frequency band for use in radio control. A common feature to the practice of radio control is that the channel, to which a receiver is tuned, is set by a replaceable crystal. The channel to which a radio control transmitter is tuned is also commonly set by a replaceable crystal. Before commencing to transmit a modeller has to check whether the channel to which her or his transmitter and receiver are tuned is in use by some one else. There are systems for allowing such checks including flying indicative pennants on or near the transmitter, and pegboards on which a modeller indicates the use of a channel. If a modeller finds her or his intended channel in use, s/he can either wait until it becomes free, or retune the transmitter and receiver to a channel which is not in use. This can involve changing two crystals, one of which, in the receiver, may involve partly disassembling the model.

Against this background the invention provides a radio control receiver for operating a plurality of devices each on a respective device channel, the receiver having data storage containing code unique to the receiver, a tuner arranged to scan a plurality of radio channels, and a processor for processing receiver identifying code received on a channel, with the unique code to determine whether transmissions on the channel are intended for the receiver, said tuner being responsive to an output from the processor indicating that transmissions on the channel are intended for the receiver, to lock onto that channel, and to the output from the tuner indicating that the transmissions on that channel are not intended for the receiver, to tune to another of the plurality of radio channels. Having ascertained that a channel is free, the modeller tunes her or his transmitter, switches that on and switches on the receiver. The latter identifies the channel and locks on to it.

The unique code is preferably processed with received code periodically, in one example each time a set of failsafe information is received. In another example the unique code is processed with received code each time a frame of data for a set of device channels is received.

To simplify setting up the transmitter, the unique code is preferably interrogable at a communication port. In a simple example, the unique code is the serial number of the receiver and this is displayed externally on the receiver.

In one preferred example, the receiver is part of a transceiver equipped to transmit signals indicating poor reception.

In one simple effective arrangement, the processor is operative to compare the received code with the unique code and to give an output indicating that the transmissions on the channel are intended for the receiver when the compared code are identical, and otherwise to indicate that the transmissions on that channel are not intended for the receiver.

The invention also extends to a radio control transmitter for transmitting signals to a receiver in accordance with the invention, so as to operate a plurality of devices each on a respective device channel, the transmitter having data storage for storing codes which when processed with a corresponding unique code indicate that transmissions are intended for the receiver, an input device for setting codes in the data store and for selecting codes for transmission, and a processor for transmitting control data and a selected code on the same radio channel. If the modeller intends to use the transmitter with more than one model, then before transmissions are effective, the correct code must be selected. This may be stored as part of other set up information for the model, control throws, for example, so that provided each model has it own receiver, selecting the wrong model by mistake will not operate the intended model with the wrong set up information.

One embodiment of the invention will now be described, by way of example, with reference to the accompanying drawings, in which.

Figure 1:
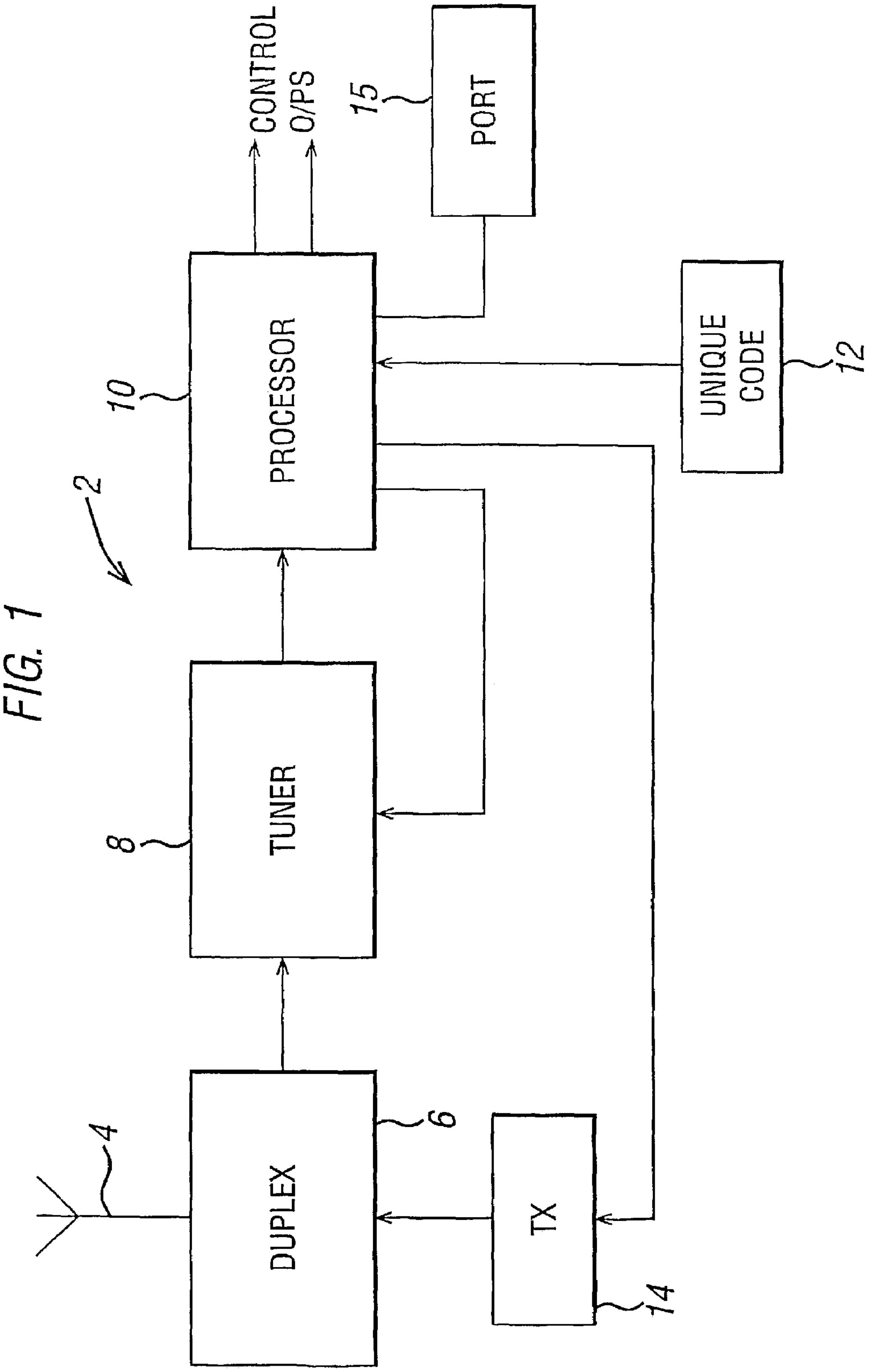
FIG. 1 is a block diagram of a radio control receiver embodying the invention.

Referring to the drawings, the radio control receiver 2 shown in FIG. 1 has an antenna 4 coupled to a duplexer 6. Signals received by the antenna 4 are coupled through the duplexer 6 to a scanning frequency synthesising tuner 8. When switched on, the tuner 8 is operative to tune to a selected channel in a set of channels contained by a frequency band assigned to radio control. The selected channel may be predetermined, e.g. the last used by the receiver, or may be random. Signals received on the tuned channel are sent from the tuner to a processor 10. This processes the received signals to see if it can find code identifying itself. To do this it retrieves a unique code by which it is identified from a data store 12 and looks for corresponding code in the received signals. The data store 12 may be in any convenient form, e.g. read only memory, hard-wired links, dual in line switches etc. The received signals and the unique code are processed, in one example, by comparing one with the other. If code is identified in the received signals, which is identical to the unique code, a signal is output from the processor to the tuner to lock onto the channel. The processor also begins outputting control signals to devices to be controlled on separate device control channels.

If the processor does not identify code corresponding to the unique code, the signal output to the tuner instructs it to tune to another channel and the process is repeated. The channels are selected one after another until received code corresponding to the unique code is found.

The processor is also arranged to assess the quality of the received signals. Conventionally, the received signals contain check digits. The bit error rate is determined by the processor from these and if the rate is too high, a signal is sent to a transmitter 14 coupled to the duplexer 6 by which the radio control transmitter 16 (FIG. 2) is instructed to use another channel. This causes loss of the corresponding code from the signals received by the receiver 2. The outputs to the control devices are now changed to fail safe settings, which may have been stored in the data store 12 and the tuner is instructed to change channels until a channel containing the corresponding code is found.

In order to simplify setting up a transmitter to use with the receiver, it may have a port 15, e.g. an infrared communications port, USB port etc by which it may be interrogated to determine the unique code.

Figure 2:
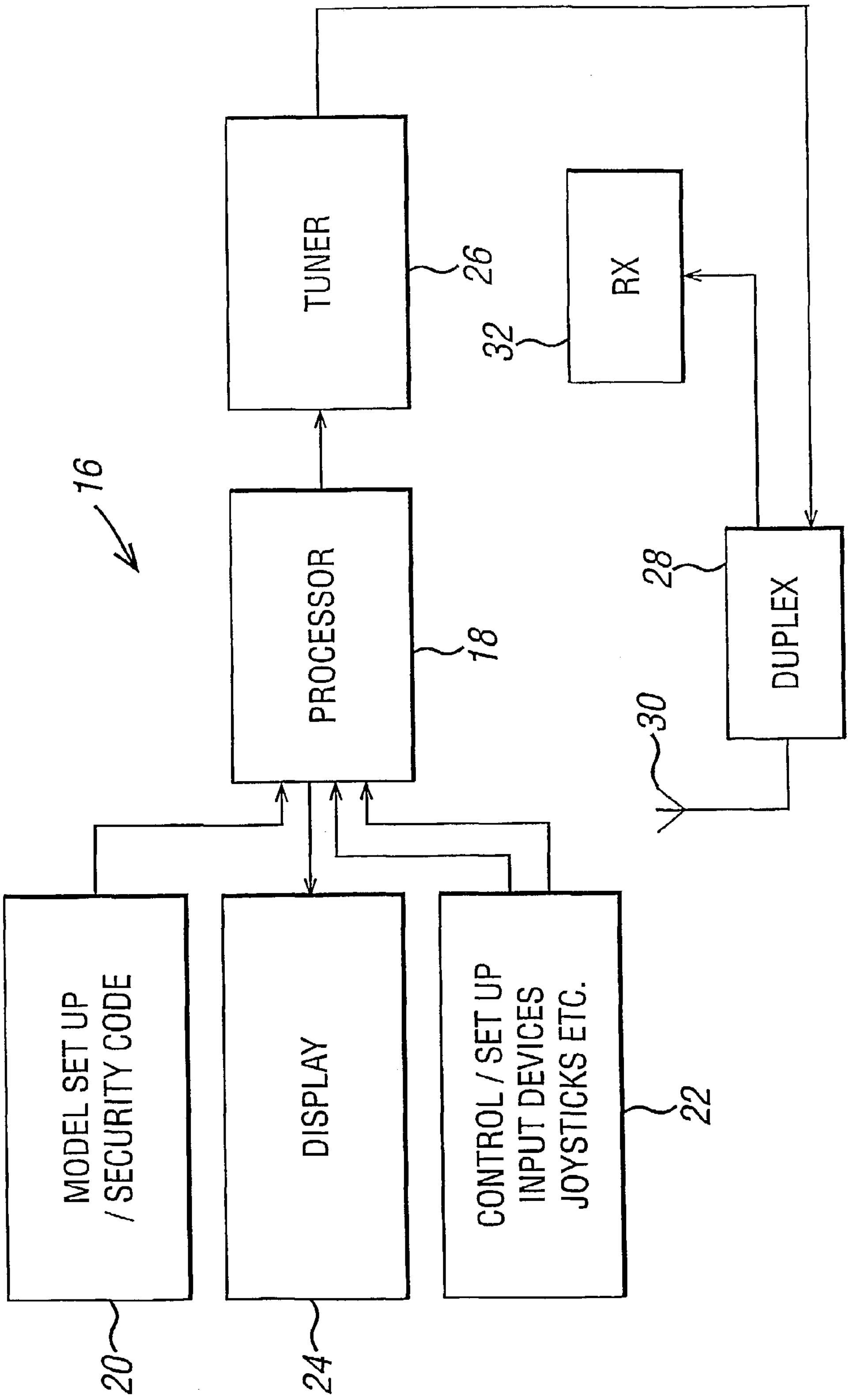
FIG. 2 is a block diagram of a radio control transmitter embodying the invention.

Referring to FIG. 2, the radio control transmitter 16 has a processor 18. In common with conventional (computer) transmitters, it also has a store 20 in which model set up information is stored with a model identity. This may not be unique, for example, being the name of the model type e.g. "tiger moth". Commonly, the store is used to store the set up information for a plurality of models, the data being used to set, say, control throws and directions and being retrieved by selecting the model's identity.

Along with this information, for each model there is stored a code corresponding to the unique code of the model's particular receiver for that user. This may be the same as the unique code or not depending on the way the receiver processes the information.

The transmitter has a number of input devices 22, usually including joysticks and switches, and a display screen 24 on which information may be presented to the user, e.g. model identity. Use of the input devices enables a model to be selected. Selection of a particular model causes the processor 18 the adopt the set up appropriate for the model and to send control information determined by the input devices, together with code corresponding to the receiver's unique code for the selected model, to a tuner 26. The processor also indicates to the tuner what channel to use, this may be set by use of the input devices 22 and display 24. The tuner sends to control and corresponding code, in the selected radio channel, via a duplexer 28 to an antenna 30.

In an alternative, a receiver 32 may scan channels in the radio control frequency band to determine an idle channel and communicate that to the processor.

An indication of poor reception from the transmitter 14 is sent by the receiver 32 to the processor, which selects another channel from any that are idle.

In another alternative, the receiver 32 is periodically tuned to the channel in use by the transmitter. Transmission is ceased while the receiver determines if there is interference on the channel in use. If there is significant interference, the tuner 26 is retuned to another, idle, channel.

Figure 3:
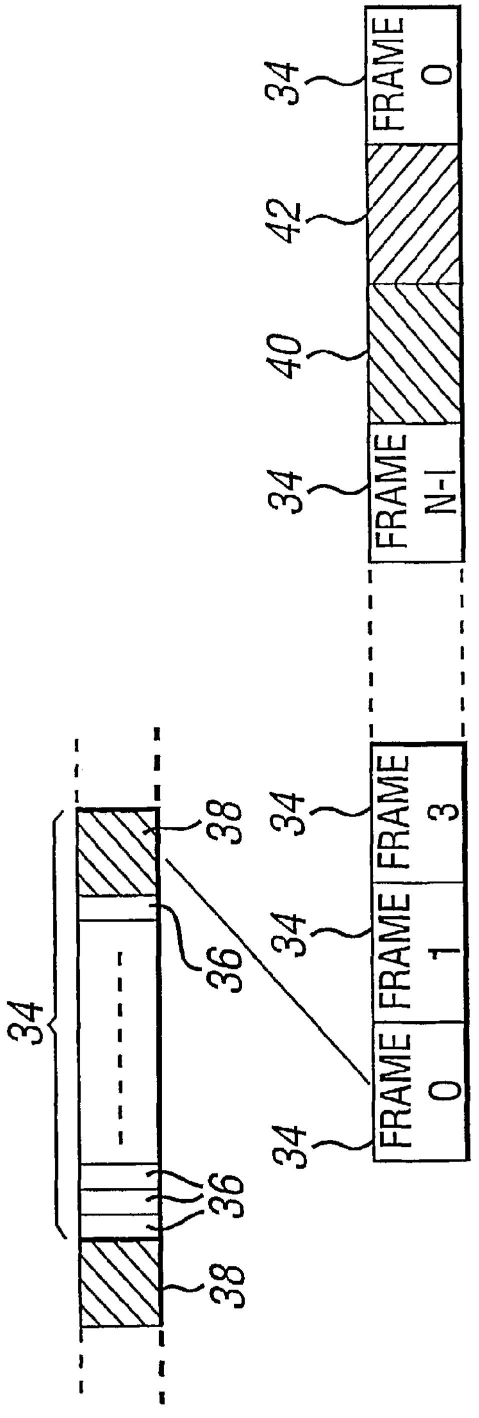
FIG. 3 is a schematic showing an example of signals exchanged between the transmitter of FIG. 2 and the receiver of FIG. 1.

Referring to FIG. 3, the format of the signals exchanged between the transmitter 16 and the receiver 2 is a repeated frame 34. Each frame 34 contains control data for, say 10 device channels 36, and check data 38 from which the quality of the received signals can be determined. In some examples, an error correcting code is used.

At regular intervals of N frames, fail-safe information 40 is sent containing positions to which the control devices are set if contact with the transmitter 16 is lost. At these intervals, the code 42 corresponding to the receiver's unique code is also sent.

Figure 4:
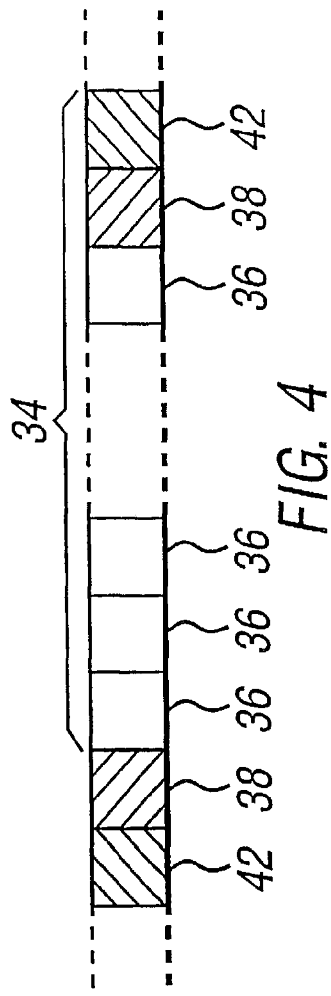
FIG. 4 is a schematic showing another example of signals exchanged between the transmitter of FIG. 2 and the receiver of FIG. 1.

In another arrangement shown in FIG. 4, the code 42 is sent in each frame, e.g. after the check digits 38.

What is claimed is:

1. A radio control receiver for receiving, on one of a plurality of radio channels, receiver identifying code and control data in a periodically repeated time frame for operating a plurality of devices in a model in accordance with respective control data on each of a plurality of device channels included within said one radio channel, the receiver having data storage containing a code unique to the receiver, a tuner arranged to scan a plurality of radio channels, and a processor for processing receiver identifying code received on a scanned radio channel with the unique code to determine whether transmissions on the scanned radio channel are intended for the receiver, and said tuner being responsive to an output from the processor indicating either that transmissions on the scanned radio channel are intended for the receiver, for thus causing the tuner to lock onto said scanned radio channel, or that the transmissions on said scanned channel are not intended for the receiver, for thus causing the tuner to tune to another of the plurality of radio channels.

2. A receiver as claimed in claim 1, wherein the unique code is processed with a received code periodically.

3. A receiver as claimed in claim 2, wherein the unique code is processed with a received code each time a set of failsafe information is received.

4. A receiver as claimed in claim 2, wherein the unique code is processed with a received code each time a frame of data for a set of device channels is received.

5. A radio control transmitter for transmitting signals to a receiver as claimed in claim 1, so as to operate a plurality of devices each on a respective device channel, the transmitter having data storage for storing codes which when processed with a corresponding unique code indicate that transmissions are intended for the receiver, an input device for setting said codes in the data store and for selecting said codes for transmission, and a processor for transmitting control data and a selected code on the same radio channel.

6. A transmitter as claimed in claim 5, wherein the selected code is transmitted periodically.

7. A transmitter as claimed in claim 6, wherein the selected code is transmitted each time a set of failsafe information is transmitted.

8. A transmitter as claimed in claim 6, wherein the selected code is transmitted each time a frame of data for a set of device channels is transmitted.

9. A transmitter as claimed in claim 5, wherein said input device includes means for interrogating a communication port of the receiver.

10. A transmitter as claimed in claim 5, which is part of a transceiver equipped to receive signals indicating poor reception from the receiver and to change channels in response to receipt of such signals.

11. A transmitter as claimed in claim 5, which is part of a transceiver equipped to receive signals on the channel in use by the transmitter, the transceiver being arranged to cease transmission periodically and then to change the channel in the event that significant interference is received on the channel in use.

12. A transmitter as claimed in claim 5, wherein the stored code is identical to the unique code.

13. A receiver as claimed in claim 1, wherein the unique code is interrogable at a communication port.

14. A receiver as claimed in claim 1, wherein the receiver is part of a transceiver equipped to transmit radio signals indicating poor reception.

15. A receiver as claimed in claim 1, wherein the processor is operative to compare the received code with the unique code and to give an output indicating that transmissions on the channel are intended for the receiver when the compared codes are identical, and otherwise to indicate that the transmissions on that channel are not intended for the receiver.

* * * * *